United States Patent [19]
Hicks

[11] Patent Number: 5,943,677
[45] Date of Patent: Aug. 24, 1999

[54] SPARSITY MANAGEMENT SYSTEM FOR MULTI-DIMENSIONAL DATABASES

[75] Inventor: Grant E. Hicks, Acton, Mass.

[73] Assignee: Oracle Corporation, Redwood Shores, Calif.

[21] Appl. No.: 08/961,640

[22] Filed: Oct. 31, 1997

[51] Int. Cl.⁶ .................................................. G06F 17/30
[52] U.S. Cl. ............................ 707/205; 707/1; 707/102; 707/503
[58] Field of Search .............................. 707/1, 100, 102, 707/205, 503

[56] References Cited

U.S. PATENT DOCUMENTS

| 5,359,724 | 10/1994 | Earle | 707/205 |
| 5,592,666 | 1/1997 | Perez | 707/102 |
| 5,604,854 | 2/1997 | Glassey | 707/503 |

Primary Examiner—Thomas G. Black
Assistant Examiner—John C. Loomis
Attorney, Agent, or Firm—Hamilton, Brook, Smith & Reynolds, P.C.

[57] ABSTRACT

In a multi-dimensional database, a composite data construct is created to accommodate sparse dimensions. When the database is defined, sparse dimensions are identified and composites of those sparse dimensions are created. The composites are stored in a linearized array. The amount of storage space allocated is chosen by the database administrator to satisfy reasonable expected growth of the sparse data.

30 Claims, 10 Drawing Sheets

SPARSITY MANAGEMENT SYSTEM FOR MULTI-DIMENSIONAL DATABASES

BACKGROUND

Although tabular databases can be used to store many types of information, they are generally limited to representing data in two dimensions. Many users, however, have a need for data having several dimensions. For those purposes, multi-dimension databases are much more versatile than tabular or relational databases. In multi-dimensional databases, data values are located at points in an n-dimensional conceptual space defined by specific positions along one or more axes. For example, three axes specifying month, product and sales district would delineate a three-dimensional space containing sales data. Each individual dollar value for sales would be identified by the combination of one specific point along each axis: the sales value for a specific month, product and sales district. The n-dimensional space can be visualized as a data cube.

In a typical multidimensional data cube, a storage location is allocated for every possible combination of every dimensional value. For example, in a three-dimensional data cube wherein each dimension has three possible values, 27 storage locations are allocated, one for each possible combination of the dimensional values. The lowest level detail data is typically provided by data entry and each upper level data cell is then computed by aggregating the detail data to fill in the data cube. To speed access time for users, the data cube can be stored in main memory.

In many multi-dimensional data cubes, especially large ones with many different dimensions, there are certain combinations of dimensional values for which there are relatively few data values. For example, if a data cube contains sales values dimensioned by product, region, and time, there may not be any sales values for certain products in certain regions during at least some time periods. In large multi-dimensional databases having several dimensions, it is fairly common for most of the data cube to be empty. Indeed, certain financial data may be much less than one percent populated.

Dimensions having many dimensional value combinations for which there are relatively few data values are referred to as "sparse." For sparse dimensions, it is wasteful to allocate storage space for each possible combination of dimensional values because many of the combinations will contain no data values. Instead, storage space can be allocated only for those dimensional combinations having data values. The problem of efficiently allocating storage space in a multi-dimensional data cube is referred to as "sparsity management."

A typical technique to implement sparsity management is to combine the sparse dimensions into a single dense dimension. For example, when not all products are sold in all regions (i.e., product and region are sparse dimensions), then this technique creates a new dimension whose values are the combinations of product and region where actual data exists. Combinations of product and region having no associated sales values would be eliminated. By this mechanism, the sparse dimensions of the data are replaced by a single combination dimension. The resulting data is stored densely using (n−(s−1)) dimensions, where n is the original number of dimensions and s is the number of sparse dimensions in the combinations. Storage is thereby allocated only for those combinations of sparse dimension values that have some data associated with them, reducing the amount of storage space required.

Combination dimensions are effective for optimizing storage allocation; however, this efficiency comes with a cost of increased overhead. In particular, the combination dimension is maintained separately from the underlying dimensions. That is, software solutions are provided to make sure that the combined dimensions are updated as new combination dimension values become populated with data. In addition, dimension value limits may need to be synchronized between the underlying dimensions and the combination dimensions. Furthermore, the combinations are explicitly sorted to obtain an ordered report. Consequently, support for any combination dimension should be incorporated at all levels or database management.

There can also be an increased cost at run time for combination dimensions. This increased processing is primarily a result of the fact that when a combination dimension is declared, a different cube is created. In order to show data from the original n-dimensional cube (which is what the user most likely would want to see), the n−(s−1)-dimensional cube first needs to be transformed into the n-dimensional cube. This transformation, performed during run time, imposes an extra burden on the system, which in turn, hinders system performance.

SUMMARY OF THE INVENTION

Preferred embodiments of the present invention provide a mechanism for deriving the benefits of combining dimensions without suffering the added processing cost. According to preferred embodiments of the invention, sparse dimensions are combined into a "composite" dimension. The composite dimension is automatically maintained and treated as a physical optimization of the underlying sparse dimensions instead of as a separate object with its own characteristics (such as status, sort order, etc.) In terms of storage, composites can be densely packed by only allocating storage for combinations of the sparse dimension variables that actually have associated data values or loosely packed by allocating excess storage to accommodate expected expansion of the sparse dimension values. In terms of treatment, however, the composite is not treated like a dimension. Rather, the dimensions that make up the composite remain and are manipulated like any other dimension. Because the composite is not treated like its own dimension, there is no need to logically transform the original n-dimensional cube into another dimensional cube. Instead, the original cube is itself structured to accommodate sparse data. Because of this, no extra coding or user thought is needed to view and manipulate the original cube.

A preferred embodiment of the invention is a method and system for storing data in a multi-dimensional database. The method is preferably a computer-implemented program embodied in a computer-readable medium.

The program preferably receives input data dimensioned by a plurality of base dimensions. In particular, at least one combination of base dimensions is sparsely populated with data.

The program defines a composite of the sparse base dimensions. The program synchronizes the sparsely populated base dimensions with the composite. In particular, a status of the sparsely populated base dimensions is incorporated into a status of the composite.

The program stores the populated data of the composite in a first block of data cells having a pre-selected size. The sizing is preferably selected so the first block of data cells can accommodate an expected maximum size for the populated data over time. In particular, the program allocates a linearized array of data cells for the first block.

To store data, a target data cell for storing a data value can be located from information stored in a descriptor. Then the data can be stored in the target data cell. The target data cell may not, however, be located in the first block. In that case, the program annexes a second block of data cells to the first block, the second block including the target data cell. The descriptor is also modified to localize the target data cell in the second block.

The program preferably includes a report generator. The report generator can generate a multi-dimensional report to include data stored the first block. The report can be limited by the sparsely populated base dimensions.

The above and other features of the invention, including various novel details of construction and combination of parts, will now be more particularly described with reference to the accompanying drawings and pointed out in the claims. It will be understood that the particular sparsity management system for multi-dimensional databases embodying the invention is shown by way of illustration only and not as a limitation of the invention. The principles and features of this invention may be embodied in varied and numerous embodiments without departing from the scope of the invention.

DETAILED DESCRIPTION OF PREFERRED EMBODIMENTS OF THE INVENTION

Figure 1:
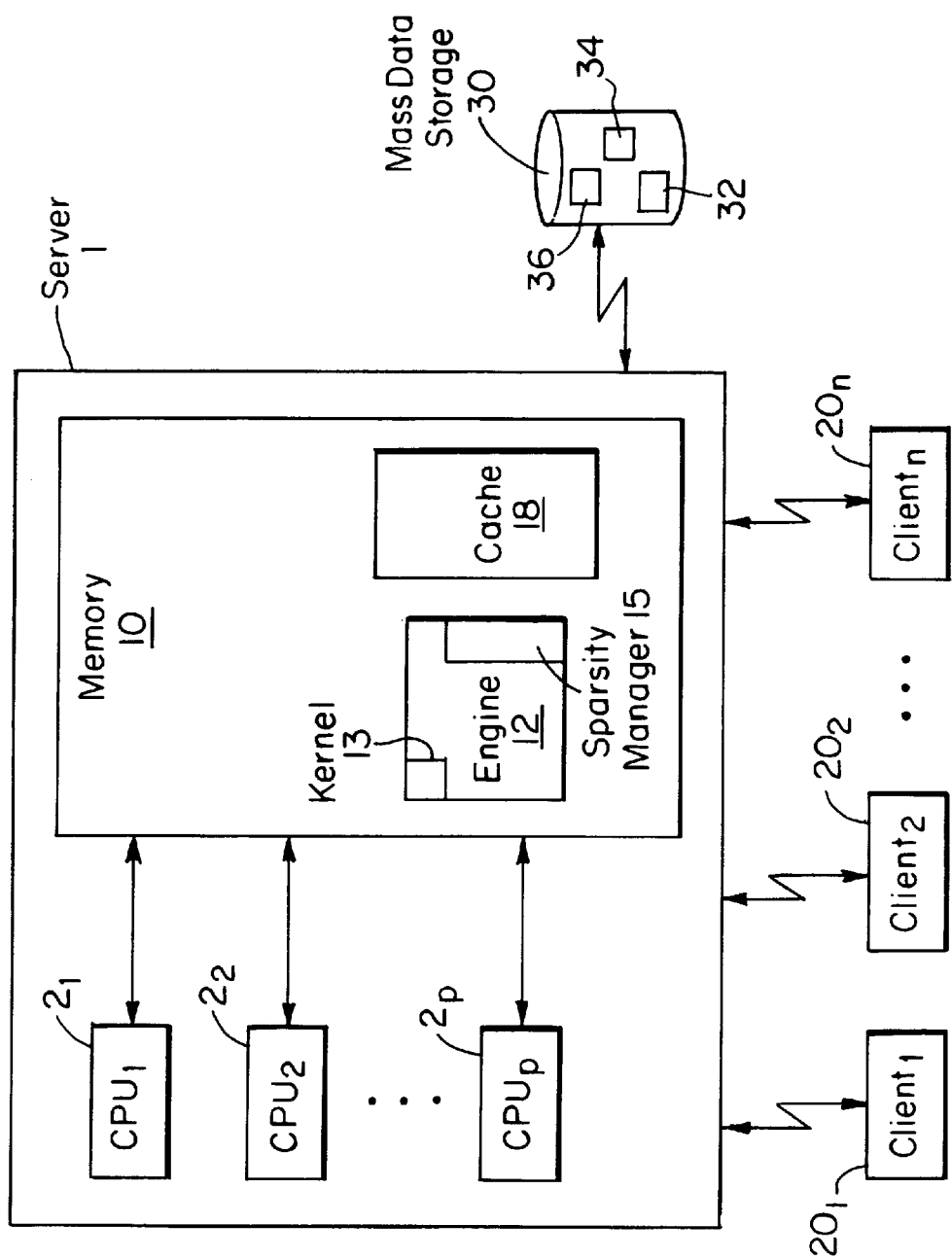
FIG. 1 is a schematic block diagram of an on-line analytic processing (OLAP) system embodying the invention.

FIG. 1 is a schematic block diagram of an on-line analytic processing (OLAP) system embodying the invention. A server 1 responds to requests from a plurality of client users $20_1, 20_2, \ldots, 20_n$. To satisfy client requests, the server 1 retrieves data from a data storage warehouse 30, which can include various databases, such as relational databases 32, multi-dimensional databases 34 and temporary databases 36 stored on disk. Preferably, the multi-dimensional databases 34 are embodiments of a multi-cube model, where each data measure, such as "sales" or "expense" or "margin", has only the dimensions it needs.

The server 1 includes at least one central processing unit (CPU) $2_1, 2_2, \ldots, 2_p$. The CPUs 2 execute client or user sessions and system management processes to operate on data stored in memory 10, which includes an OLAP engine 12 and a cache memory 18. The OLAP engine 12 includes a kernel 13 and a sparsity manager 15.

The user sessions and system management processes preferably include processing threads managed in a multi-threaded OLAP engine 12. That is, user sessions can accomplish tasks by asynchronously executing processing threads. Embodiments of the invention preferably take the form of computer-executable instructions embedded in a computer-readable format on a CD-ROM, floppy or hard disk, or another computer-readable distribution medium. These instructions are executed by one or more CPUs $2_1, 2_2, \ldots, 2_p$ to implement the OLAP engine 12. A particular embodiment of the invention is commercially available as Oracle Express Server, version 6.0, from Oracle Corporation.

Figure 2:
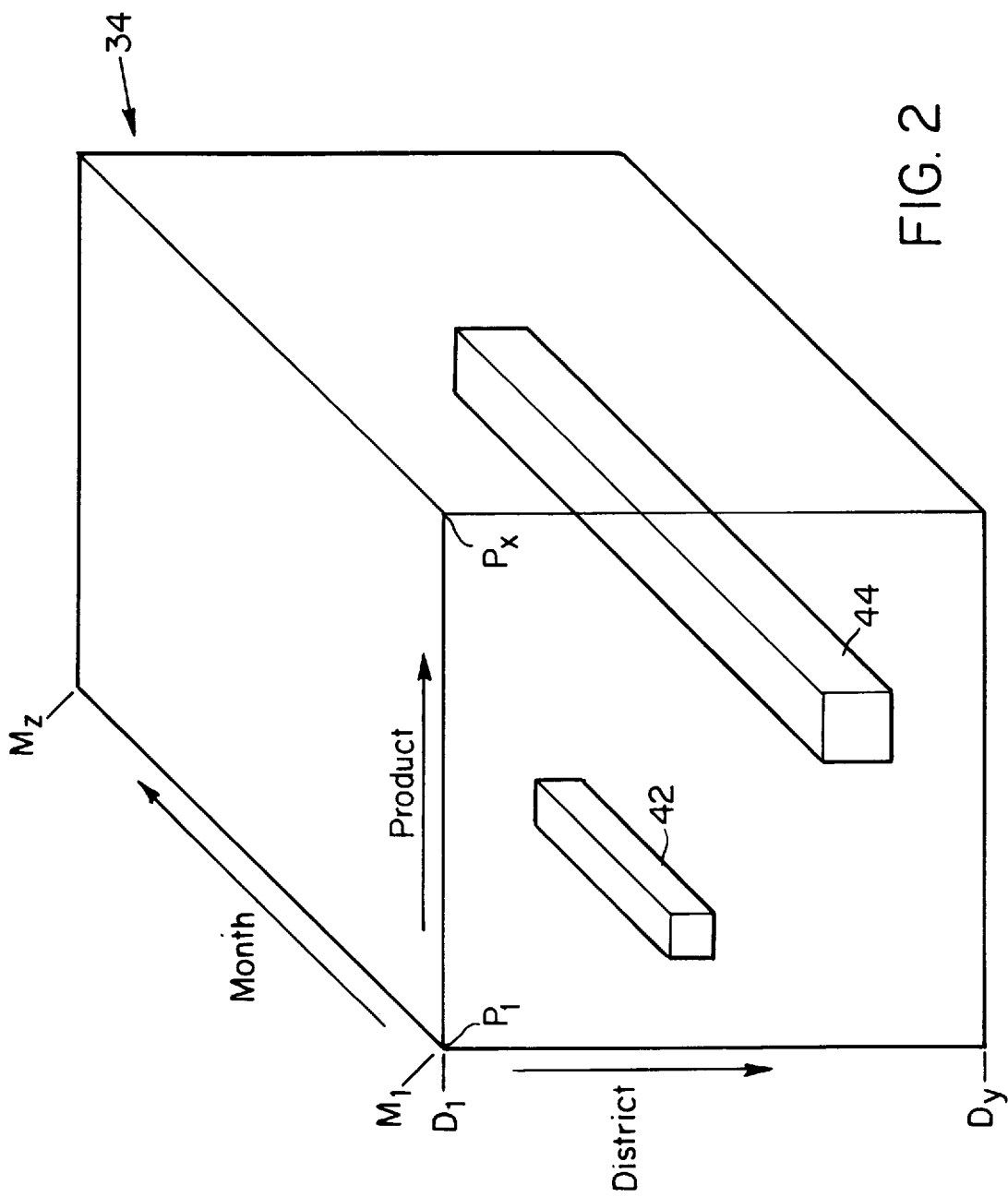
FIG. 2 is a schematic block diagram of a prior art data cube.

FIG. 2 is a schematic block diagram of a prior art data cube. As illustrated, the data cube 34 has three axes, District, Product and Month dimensions, to store data representing sales over time. The Product dimension includes dimension values $P_1$–$P_x$; the District dimension includes dimension values $D_1$–$D_y$; and the Month dimension includes dimension values $M_1$–$M_z$. A data cell is defined to be the intersection of the three axes dimension values in the data cube 34. The example data cube 34, therefore, has a volume V of data cells given by:

$(x) \times (y) \times (z)$.

Although there are V data cells defined by the data cube, all data cells may not be populated with data. In fact, in many dimensions, the data cube may be sparsely populated. As an illustration, subsections 42,44 of the data cube may be the only populated regions of the data cube 34. By allocating storage for the entire cube volume V, there may be unused storage space. It is therefore desirable to reduce the amount of wasted storage allocation.

Figure 3A:
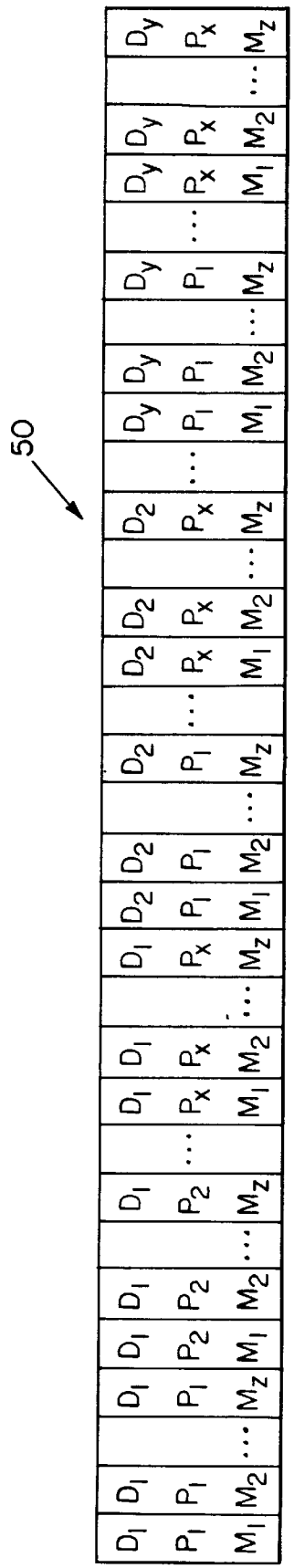
FIGS. 3A–3B are schematic diagrams of a prior art storage array for storing the data cube of FIG. 2.
Figure 3B:
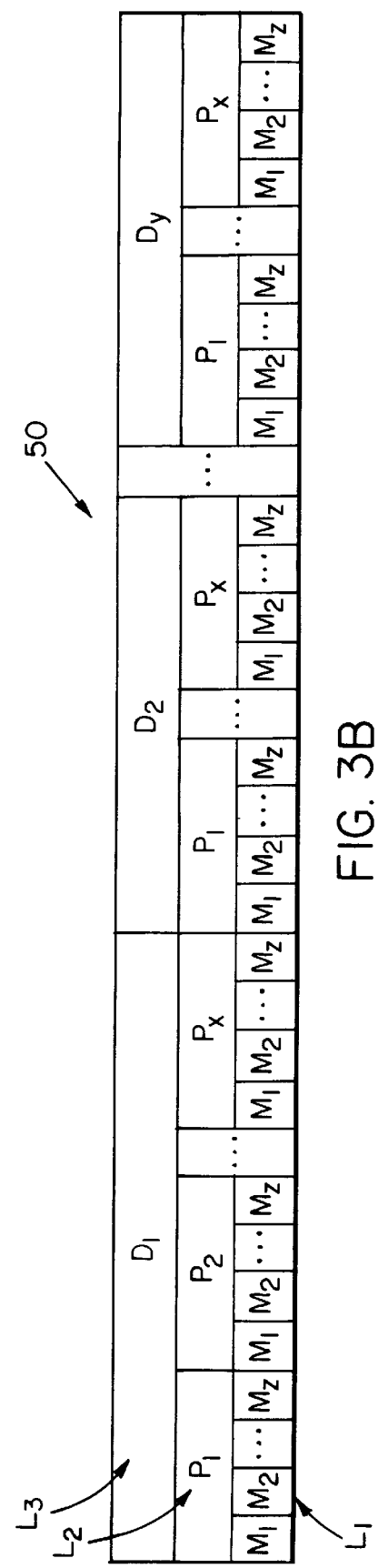

FIGS. 3A–3B are schematic diagrams of a prior art storage array for storing the data cube of FIG. 2. As illustrated in FIG. 3A, each combination of dimension values in the array 50 is allocated a storage cell. It is advantageous to represent the array 50 in such a way that data values frequently accessed together are stored physically near each other. For example, if data for all months for a given Product-District pair were commonly to be used together (for example, to calculate a year-to-date total for that Product and District), then access would be speeded by storing all months together for each combination of Product and District. This establishes a default looping order for the dimensions of the data cube wherein Month varies fastest. Other access patterns might then dictate that Products vary within Districts, making District the slowest varying dimension.

FIG. 3B is an alternative representation of the storage array 50 of FIG. 3A, more clearly depicting the rate of change of the dimensions. As more clearly depicted, the lowest (fastest) detail level $L_1$ is the Month level, the middle level $L_2$ is the Product level, and the upper (slowest) level $L_3$ is the District level.

In a practical data cube there would likely be lower levels (e.g., day values) and higher levels (e.g., states, regions). As the number of levels increases, the storage requirements of the databases increases exponentially. Thus, sparse data at the lowest detail level propagates to large areas of unused storage. To reduce the amount of wasted storage, the storage structure is preferably compressed to reduce or eliminate sparse data storage or empty data cells.

As an example, consider a company that sells ice and coal products throughout the country. Two districts serviced by the company are Nome, Alaska, and Miami, Florida. The company tracks sales by month and the database is first created in April using the January–March data given below in Table I.

TABLE I

|  | Ice | Coal |
|---|---|---|
| January: |  |  |
| Nome | 0 | 10 |
| Miami | 6 | 0 |
| . . . |  |  |
| February: |  |  |
| Nome | 0 | 10 |
| Miami | 6 | 0 |
| . . . |  |  |
| March: |  |  |
| Nome | 0 | 9 |
| Miami | 10 | 0 |
| . . . |  |  |

Figure 4:
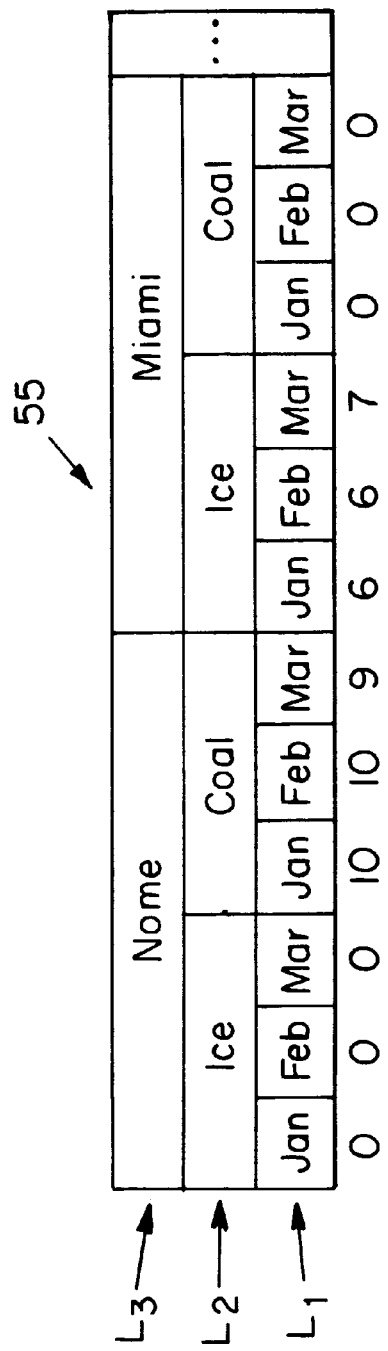
FIG. 4 is a schematic diagram of a prior art storage scheme for the data in Table I.

FIG. 4 is a schematic diagram of a prior art storage scheme for the data in Table I. The data is stored in a linearized array 55 of data cells, indexed by values of the three dimensions. Because there are no sales in either month for ice in Nome and coal in Miami, there are unused storage cells. These six empty cells could be eliminated from the storage scheme without affecting the integrity of the data in the database 34.

An additional problem arises when it is time to add the next month's data into the database 34. Table II below provides data values for the month of April.

TABLE II

| April: | Ice | Coal |
|---|---|---|
| Nome | 0 | 8 |
| Miami | 9 | 0 |
| . . . |  |  |

Figure 5:
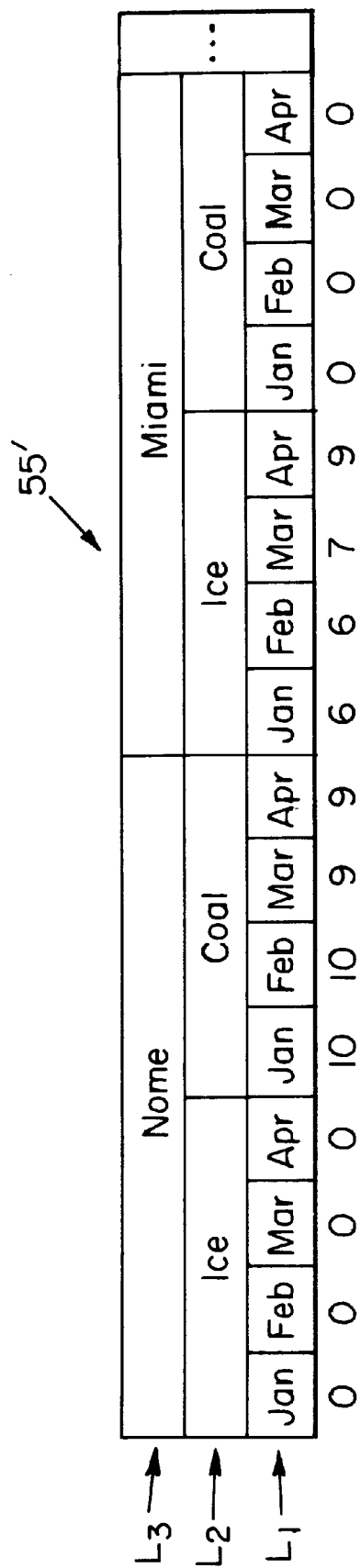
FIG. 5 is a schematic block diagram of a prior art storage scheme for adding the data in Table II to the storage scheme of FIG. 4.

FIG. 5 is a schematic block diagram of a prior art storage scheme for adding the data in Table II to the storage scheme of FIG. 4. Note that the detail level Lt data in the array 55' must be reshuffled to accommodate the data for the new month (April). This reshuffling is computationally intensive because the changes must be propagated up the levels. Because more empty data cells have been added to the array 55', more computer storage is wasted. Over time, a large percent of the array 55' may store empty and irrelevant data.

At the time the database is configured, it is usually known which combinations of dimension values yield sparse data. Continuing with the above example, the dimensions District and Product are known to have sparse data. In accordance with a preferred embodiment of the invention, a database manager can define which combinations of dimension values are sparsely populated. A suitable syntax is:

DEFINE SALES DECIMAL <Month SPARSE <District Product>>.

Such an instruction defines the Month dimension to be collected by the sparse <District Product> composite to yield sales values.

The SPARSE directive specifies that one physical dimension of data will be represented by tuples of District and Product. In the above example, possible tuples are given in Table III below:

TABLE III

| <Nome Ice> |
| <Nome Coal> |
| <Miami Ice> |
| <Miami Coal> |

Of these tuples, only <Nome Coal> and <Miami Ice> have data values, as given by Tables I and II. Thus, all other potential tuples of District and Product can be excluded from the data cube. Although the composites are shown as being District-Product pairs, composites can be formed from an arbitrary number of dimensions. This reduces the n-dimensional cube to a (n–(s–1))-dimensional cube, where s is the number of composite dimensions.

Figure 6:
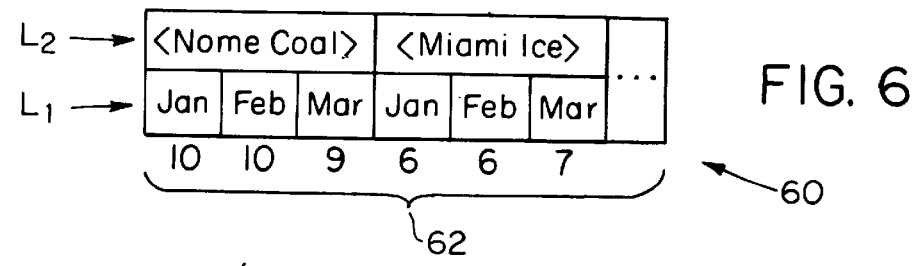
FIG. 6 is a schematic block diagram of a preferred composite storage array for storing the composite dimensions of Table III with the data from Table I.

FIG. 6 is a schematic block diagram of a preferred composite storage array for storing the composite dimensions of Table in with the data from Table I. As illustrated, the composite storage array 60 includes the tuples <Nome Coal> and <Miami Ice> in an array segment 62. Because the tuples are a composite of two dimensions, the resulting storage array 60 is reduced to two levels $L_1$ $_{L2}$. These composites are the slow "dimension" at the top level Lo; while Month remains the fast dimension at the detail level $L_1$. Because the composites <Nome Ice> and <Miami Coal> were empty in Table I, there are no entries in the array 60 for these composites. In the example, the allocated storage space required to represent the database 34 is thereby reduced.

Although the array 60 could be reshuffled to add the next month's data, a preferred embodiment of the invention can annex segments to the array 60. Before discussing the details of implementation, resulting storage arrays will be shown and described.

Figure 7:
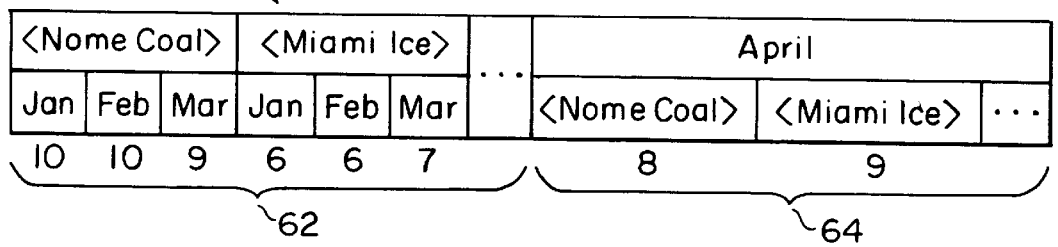
FIG. 7 is a schematic diagram of an annexed composite storage array including the data from Table II, in accordance with a preferred embodiment of the invention.

FIG. 7 is a schematic diagram of an annexed composite storage array including the data from Table II. The storage array 60' includes the original composite storage array segment 62 plus an annexed composite storage array segment 64. The annexed segment 64 has the Month (April) as the slow dimension and composites having data for the month are the fast dimension. Again, composites having no data for the month of April are excluded from the storage array 60'.

In addition to new dimension variables being added along the time axis, a new tuple can be created or a previously empty tuple can gain a value. In accordance with a preferred embodiment of the invention, the composite scheme and the annexable segments accommodate such changes to the data over time. For example, Table IV below describes data values for the next month, May.

TABLE IV

| May: | Ice | Coal |
|---|---|---|
| Nome | 1 | 5 |
| Miami | 10 | 0 |

To incorporate the data from Table IV, two new segments must be annexed to the previous segments 62,64. In the first new segment, the Month dimension is again the slow dimension and the composites are the fast dimensions. This facilitates the addition of the new populated tuple <Nome Ice> on the slow axis with the <Nome Coal> and <Miami Ice> tuples. The new populated tuple <Nome Ice> is added in the slow dimension with the empty months (i.e., January–April) on the fast dimension. In the second new segment, the Month (May) is the slow dimension while the composites are the fast dimension.

The process of locating a data cell in a dense data cube involves calculating a position in the linear data array corresponding to the product of the cell's indices along the axes of the data space. When the sparsity of the data space is compressed out using a separate combination dimension as in the prior art, the position in this dimension corresponding to the constituent sparse dimension indices needs to be found. Data cannot normally be stored if this position does not exist, because the position along this axis is undefined. Because the combination dimension is a separate entity from the constituent sparse dimensions, with its own sort order and value limits, it may be difficult to add new values without affecting the end user's view of the data. Composites, however, are not independent dimensions and can be transparently updated to include new positions.

Figure 8:
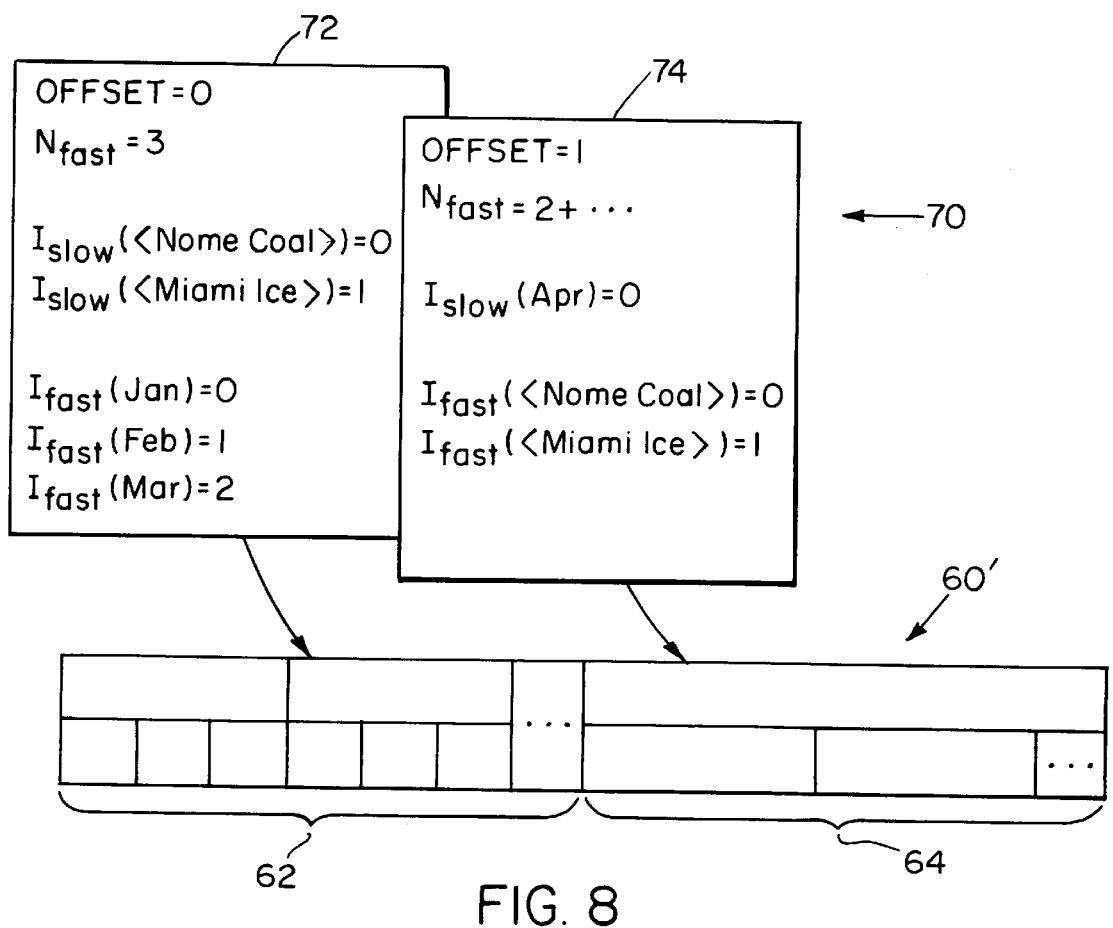
FIG. 8 is a schematic block diagram of an array segment access system for the array of FIG. 7.

FIG. 8 is a schematic block diagram of an array segment access system for the array of FIG. 7. Because the annexed array segments 64, 66 can have a different structure from the original 62 or other array segments, data cells cannot be found by merely indexing into the linear array by keying on the dimension variable values. Instead, a preferred embodiment of the invention employs a separate look-up table 72, 74 for each array segment 62, 64. In particular, a plurality of Cartesian compound descriptor (CCD) 70 are used to track the data in the storage array 60'.

Each CCD record is associated with an array segment and provides a respective array segment offset (OFFSET). The array segment offset is the sequential number of the array segment in the storage array. For each array segment, the respective CCD record provides a slow index value ($I_{slow}$) for each of the slow axis components, a fast index value ($I_{fast}$) for each of the fast axis components, and a count of the total number of fast variables stored in the array segment ($I^{fast}$). From these values, the location of any stored cell in the storage array can be located from the general equation:

$$(I_{slow} \times N_{fast}) + I^{fast} + OFFSET.$$

Because the composite can be viewed as essentially a filter applied to a set of dimensions, it may be used for retrieval as well as for storage. It is possible to control the action of a loop (for example, in reporting or retrieving data) by specifying a composite as one of the dimensions of the loop. The composite then replaces its underlying dimensions, and only combinations of these dimensions represented by values of the composite become part of the loop. This is true regardless of whether the composite has been used in storing the data. Thus even if all referenced data is stored in the full n-dimensional data cube, it may be viewed according to the sparsity pattern encoded in the composite.

Users typically query the multi-dimensional database 34 to obtain reports. For example, to create a report of sales in ascending order, a user can simply enter the query:

REPORT SALES DOWN SPARSE <District Product>.
This query preferably yields a three-dimensional report displaying District values and Month values in a table paged by Product values. By default, the report provides all relevant cell values in the data cube, even empty data. By including the SPARSE modifier, the report is preferably limited to the composite tuples.

By using composites, base and composite values are always automatically synchronized. If the user is looping over the composite (for example, in a report), then the composite's constituent dimensions are set to match the composite tuple at each loop iteration. If the user is looping over the base dimensions (the dimensions of the "cube"), the composite is synchronized with the bases. If the current loop position of the base dimensions matches a tuple in the composite, the composite is set to match that value. If the loop position of the bases does not match a tuple in the composite, the composite is set to an NA ("no data available") state. Because of this constant two-way automatic synchronization, composites, unlike prior art combination dimensions, never have a status independent of the base dimensions' status.

The actual mechanism of synchronization is as follows. In base-to-composite synchronization, the composite's tuple value is the concatenation of the base dimension values. Each base is set to the appropriate value as taken from the tuple. This happens recursively for composites nested within composites. Composite-to-base synchronization is done via an index lookup. The current values of the bases are concatenated, and the resulting value is the key to a hash or b-tree index lookup. If the lookup finds a value, the composite is set to that value. If not, the composite is set to its NA state.

In the multi-cube model environment, a given measure can be declared with or without sparsity. Because sparsity is a declared attribute of the data, there is no need for an initial probe to see whether it is sparse or not. Indeed, instead of there being an n-dimensional data cube to probe into, there is only the (n−(s−1)) composite-dimensioned cube. If a tuple is there, there is data; otherwise there is no data.

Figure 9:
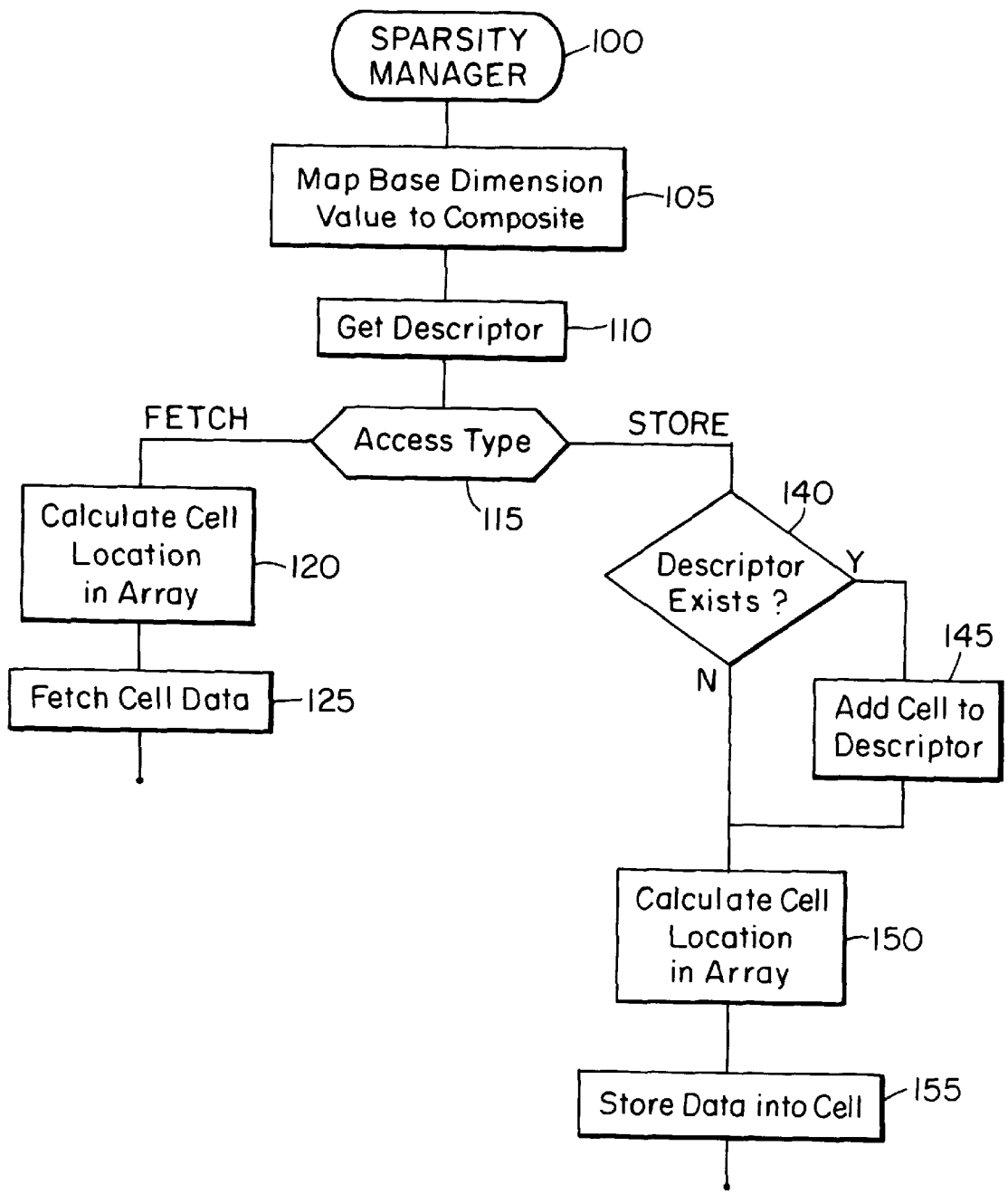
FIG. 9 is a flowchart of a preferred sparsity management process.

FIG. 9 is a flowchart of a preferred sparsity management process. The sparsity management process 100 is executed by the sparsity manager 15 (FIG. 1) and is called to access a data cell by its dimension values as virtually stored within the multi-dimensional database. At step 105, the process maps the base dimension values to the composite to determine which tuple of the composite is being referenced. This mapping is done via index lookups.

At step 110, the descriptors 70 are searched to locate the array segment storing the data cell. Processing then continues to step 115. At step 115, the type of the access (Fetch, Store) is determined. A Fetch operation causes processing to jump to step 120 and a Store operation causes processing to jump to step 140.

For a Fetch, at step 120, the physical location of the data cell in the storage array is computed from the data stored in the descriptor in accordance with the above equation. Finally, at step 125, the data cell is fetched from the storage array.

For a Store (i.e., add operation), the data cell may not be allocated in the storage array. Consequently, a check of the attempt to locate the descriptor is performed at step 140.

At step 140, if a descriptor having the data cell location information does not exist, then processing jumps to step 145, where the data cell is added to a segment descriptor. After step 145, or if a segment descriptor already existed at step 140, then processing continues to step 150 At step 150, the physical location of the data cell in the storage array is computed from the data stored in the descriptor in accordance with the above equation. Finally, at step 155, the data is stored into the data cell location in the storage array.

As should be apparent, system performance decreases with an increase in the number of array segments. Once too many array segments have been created, the database is preferably reloaded by exporting and then re-importing the data to restructure the composites into a single composite array segment. Such an operation, however, is disruptive to the use of the database. It is therefore desirable to automatically manage the array segments in such a way as to limit the need to add additional segments.

Unfortunately, the structure of a segment that has had data stored into it is locked with respect to new values of all its or composite dimensions, except for the slowest. Referring to FIG. 4, for example, adding any number of additional Districts would merely reproduce the Product/Month structure used to represent data for Nome or Miami. Thus this segment is open-ended with respect to District. However, adding new Months or Products would cause either reshuffling of the existing segment or creating a new segment.

In accordance with a preferred embodiment of the invention, each array segment is pre-allocated storage to meet anticipated growth. Although pre-allocation of storage tends to reduce the storage efficiency of the composite database, there will typically still be enough saved space to justify the addition overhead required to access the storage array. This is particularly true if null range compression can be used to avoid storing areas of the segment that are not yet in use.

Figure 10:
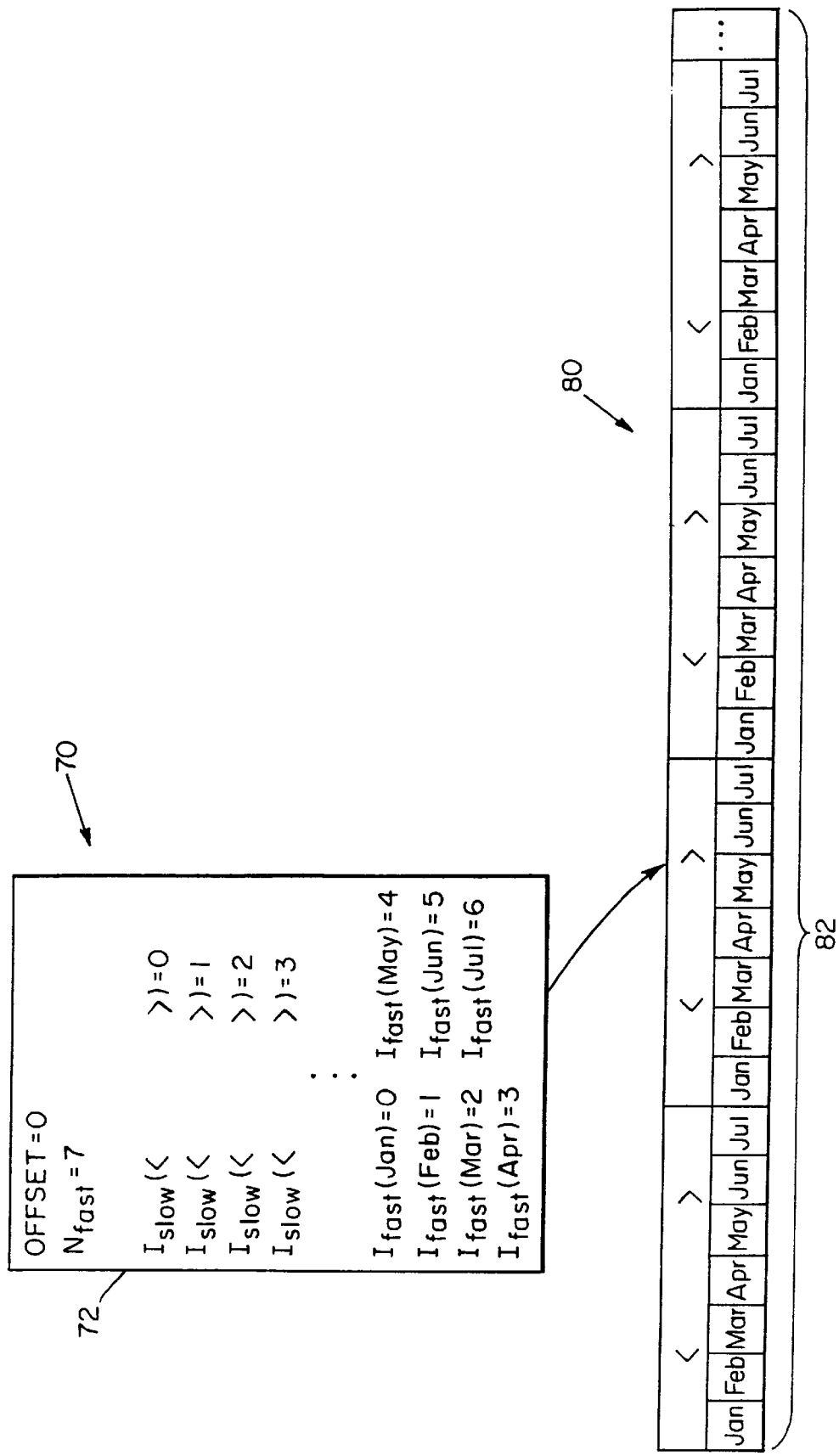
FIG. 10 is a schematic block diagram of a preferred pre-allocated storage array.

FIG. 10 is a schematic block diagram of a preferred pre-allocated storage array. First, the database administrator has anticipated that new data will be entered for future months. Therefore, additional space has been pre-allocated for a selected number of months. The selected number of months will typically depend on how frequently the database administrator is willing to reload the database—from a few months to years. Also, it is anticipated that future <District Product> tuples, such as <Nome Ice> will need to be added to the database. Consequently, empty tuple fields are pre-allocated. The descriptor field 70 is initialized to one descriptor record 72 associated with the initial segment 82 of the storage array 80.

Figure 11A:
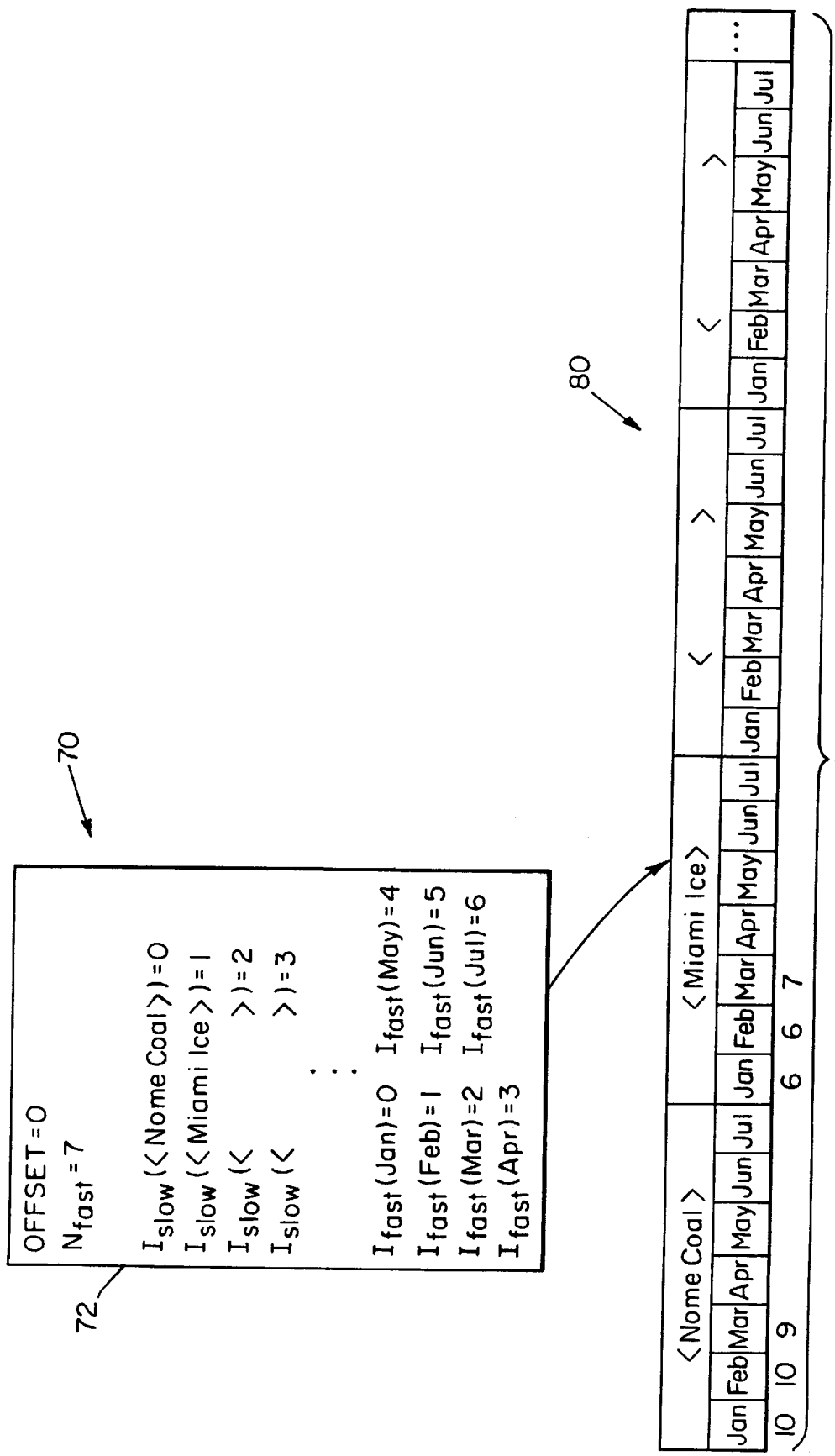
FIGS. 11A–11C are schematic block diagrams of a preferred pre-allocated storage array.
Figure 11B:
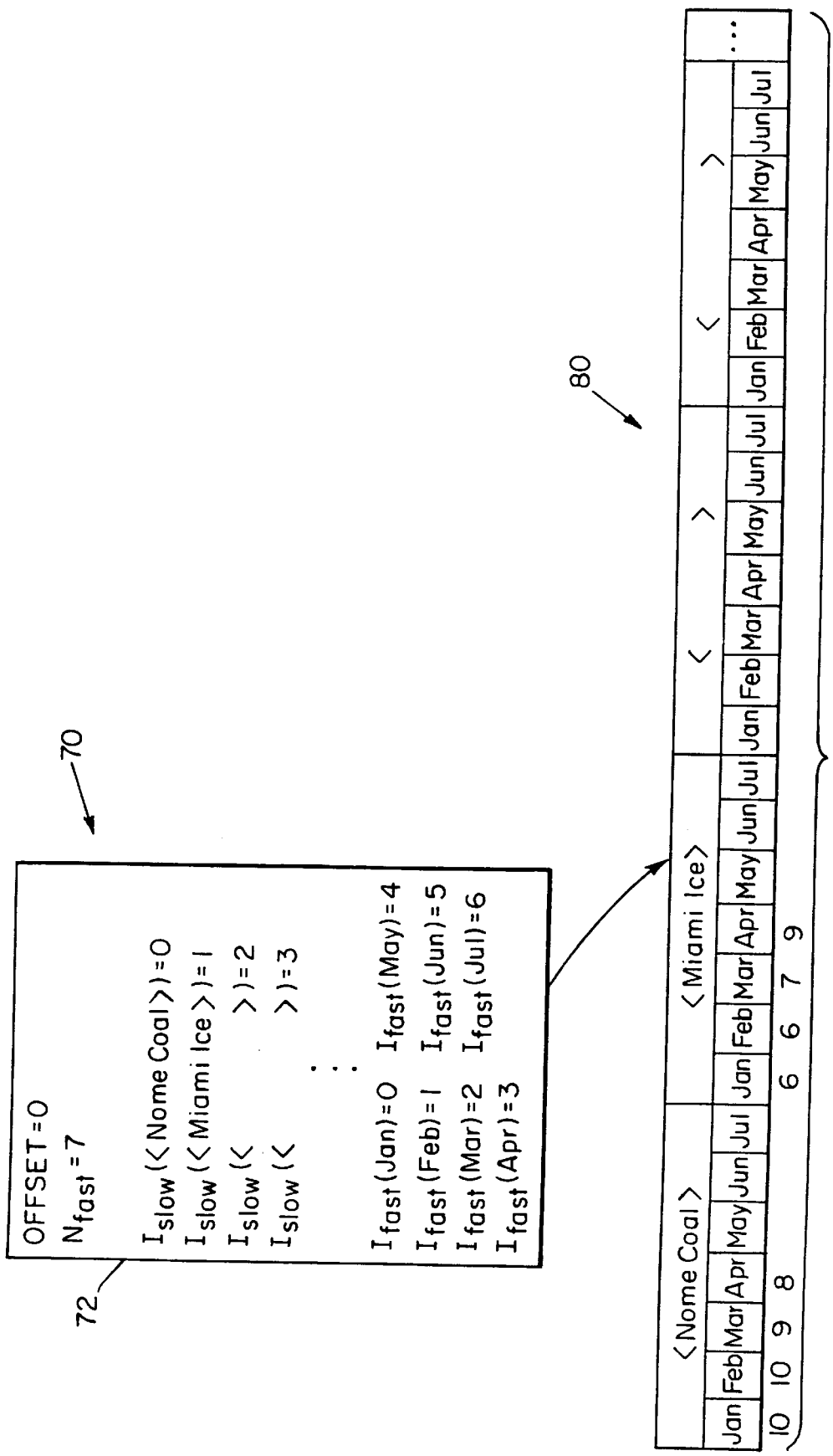
Figure 11C:
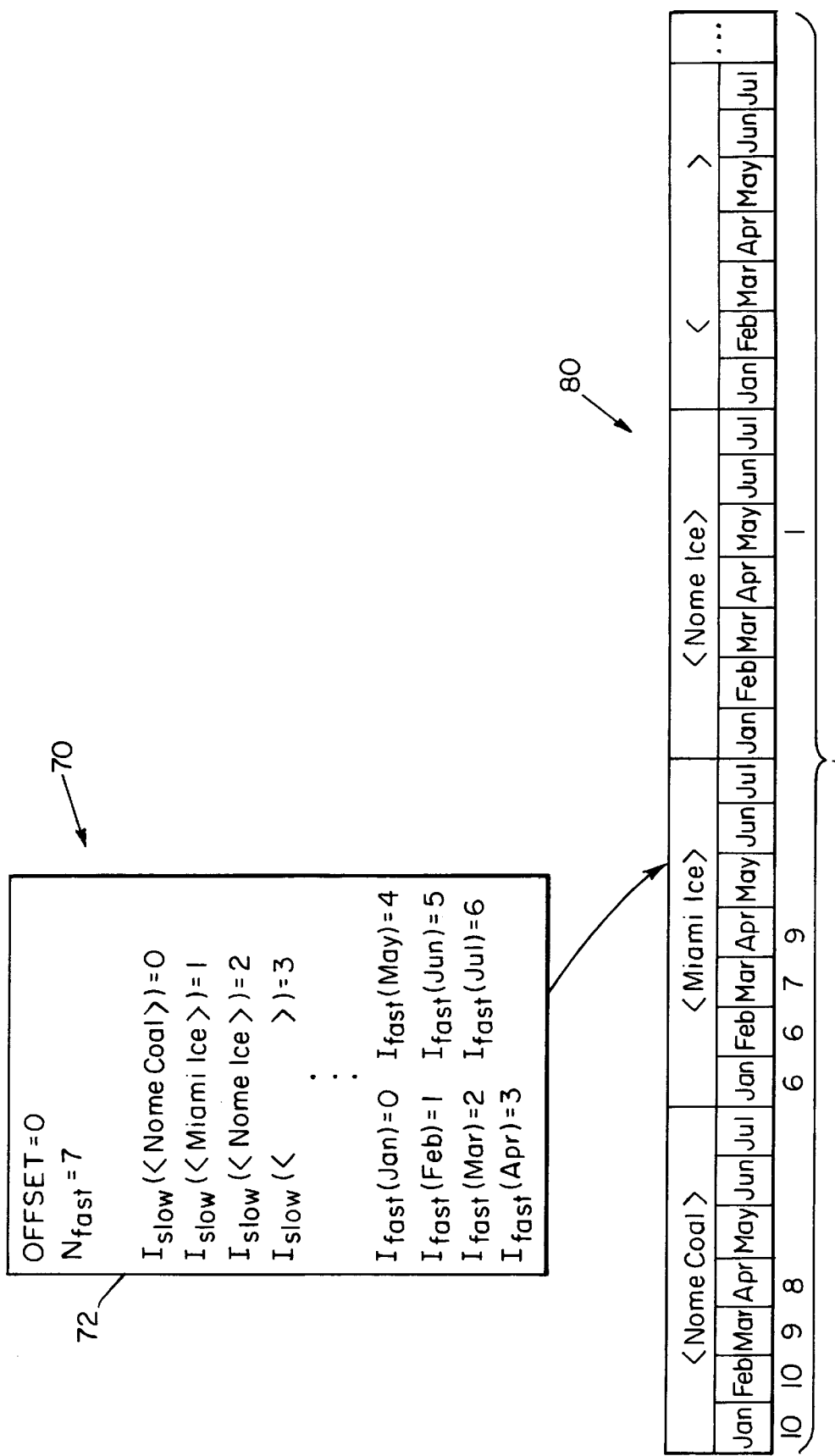

FIGs. 11A–11C are schematic block diagrams of a preferred pre-allocated storage array storing the data of Tables I, II, and IV, respectively. Note that because these data entries were originally anticipated, the same array segment 82 and segment descriptor 72 can be used.

Although the above examples illustrate annexed array segments having only a single slow dimension value, it will be understood that there can be a plurality of slow or fast dimension values. In addition, sparse dimensions can be tiered, such as:

. . . SPARSE <Month SPARSE <Product District>>.

That is, the sparse Product-District dimensions when combined with the month dimension are also known to be sparsely populated—for example air conditioners may only be sold on hot and humid days.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

The invention claimed is:

1. A method of storing data in a multi-dimensional database, comprising the steps:
    receiving input data dimensioned by a plurality of base dimensions wherein there is a combination of base dimensions sparsely populated with data;
    defining a composite of the sparse base dimensions; and
    storing the populated data of the composite in a first block of data cells, the first block having a pre-selected size.

2. The method of claim 1 wherein the step of storing comprises allocating a linearized array of data cells for the first block.

3. The method of claim 1 wherein the step of storing comprises sizing the first block of data cells to accommodate an expected maximum size for the populated data over time.

4. The method of claim 1 wherein the step of storing comprises:
    locating a target data cell for storing a data value from information stored in a descriptor; and
    storing the data value into the target data cell.

5. The method of claim 4 wherein the step of storing comprises pre-allocating a subsection of the first block to include the target data cell.

6. The method of claim 4 wherein the step of storing the data value comprises:
    annexing a second block of data cells to the first block, the second block including the target data cell; and
    modifying the descriptor to localize the target data cell in the second block.

7. The method of claim 1 further comprising the step of generating a multi-dimensional report to include data stored the first block.

8. The method of claim 7 wherein the report is limited by the sparsely populated base dimensions.

9. The method of claim 1 wherein the step of defining comprises synchronizing the sparsely populated base dimensions with the composite.

10. The method of claim 9 wherein the step of synchronizing comprises incorporating a status of the sparsely populated base dimensions into a status of the composite.

11. An article of manufacture comprising:
    a computer-readable medium;
    in the computer-readable medium, a computer-implemented method for storing data in a multidimensional database, the program comprising the program steps of:
        receiving input data dimensioned by a plurality of base dimensions wherein there is a combination of base dimensions sparsely populated with data;
        defining a composite of the sparse base dimensions; and
        storing the populated data of the composite in a first block of data cells, the first block having a pre-selected size.

12. The article of claim 11 wherein the program step of storing comprises allocating a linearized array of data cells for the first block.

13. The article of claim 11 wherein the program step of storing comprises sizing the first block of data cells to accommodate an expected maximum size for the populated data over time.

14. The article of claim 11 wherein the program step of storing comprises:
    locating a target data cell for storing a data value from information stored in a descriptor; and
    storing the data value into the target data cell.

15. The article of claim 14 wherein the program step of storing comprises pre-allocating a subsection of the first block to include the target data cell.

16. The article of claim 14 wherein the program step of storing the data value comprises:
    annexing a second block of data cells to the first block, the second block including the target data cell; and modifying the descriptor to localize the target data cell in the second block.

17. The article of claim 11 further comprising the program step of generating a multi-dimensional report to include data stored the first block.

18. The article of claim 17 wherein the report is limited by the sparsely populated base dimensions.

19. The article of claim 11 wherein the program step of defining comprises synchronizing the sparsely populated base dimensions with the composite.

20. The article of claim 19 wherein the program step of synchronizing comprises incorporating a status of the sparsely populated base dimensions into a status of the composite.

21. A system for storing data in a multi-dimensional database, comprising:

input data dimensioned by a plurality of base dimensions, wherein there is a combination of base dimensions sparsely populated with data;

a composite defined from the sparse base dimensions; and a first block of data cells storing the populated data of the composite, the first block having a pre-selected size.

22. The system of claim 21 wherein the first block is a linearized array of data cells.

23. The system of claim 22 wherein the first block is sized to accommodate an expected maximum size for the populated data cells over time.

24. The system of claim 21 further comprising a descriptor for locating a target data cell to store a data value from information stored in the descriptor.

25. The system of claim 24 wherein a subsection of the first block is pre-allocated to include the target data cell.

26. The system of claim 24 further comprising:

a second block of data cells annexed to the first block, the second block including the target data cell; and a modification to the descriptor to localize the target data cell in the second block.

27. The system of claim 21 further comprising a report generator to generate a multi-dimensional report to include data stored the first block.

28. The system of claim 27 wherein the report is limited by the sparsely populated base dimensions.

29. The system of claim 21 wherein the sparsely populated base dimensions are synchronized with the composite.

30. The system of claim 29 wherein a status of the sparsely populated base dimensions is incorporated into a status of the composite.

* * * * *